United States Patent
Chandran et al.

(10) Patent No.: US 9,233,864 B2
(45) Date of Patent: *Jan. 12, 2016

(54) SYSTEMS AND METHODS FOR ACHIEVING PARTIAL NITRIFICATION IN A BIOLOGICAL NITROGEN REMOVAL REACTOR

(71) Applicant: The Trustees of Columbia University in the City of New York, New York, NY (US)

(72) Inventors: Kartik Chandran, New York, NY (US); Ran Yu, Danbury, CT (US); Joon Ho Ahn, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 26 days.

This patent is subject to a terminal disclaimer.

(21) Appl. No.: 14/083,549

(22) Filed: Nov. 19, 2013

(65) Prior Publication Data

US 2014/0339157 A1 Nov. 20, 2014

Related U.S. Application Data

(63) Continuation of application No. 12/681,123, filed as application No. PCT/US2008/078929 on Oct. 6, 2008, now Pat. No. 8,586,337.

(60) Provisional application No. 61/125,477, filed on Apr. 25, 2008, provisional application No. 60/977,417, filed on Oct. 4, 2007.

(51) Int. Cl.

| C12P 1/04 | (2006.01) |
|---|---|
| C12M 1/00 | (2006.01) |
| C02F 3/00 | (2006.01) |
| C02F 3/02 | (2006.01) |
| C02F 101/16 | (2006.01) |
| C02F 103/00 | (2006.01) |
| C02F 103/06 | (2006.01) |
| C02F 103/20 | (2006.01) |

(52) U.S. Cl.
CPC . *C02F 3/006* (2013.01); *C02F 3/02* (2013.01); *C02F 2101/16* (2013.01); *C02F 2103/001* (2013.01); *C02F 2103/06* (2013.01); *C02F 2103/20* (2013.01); *C02F 2209/06* (2013.01); *C02F 2209/14* (2013.01); *C02F 2209/22* (2013.01); *C02F 2209/44* (2013.01); *C02F 2303/00* (2013.01); *Y02W 10/15* (2015.05)

(58) Field of Classification Search
None
See application file for complete search history.

(56) References Cited

U.S. PATENT DOCUMENTS

| 6,849,430 B2 | 2/2005 | Carson et al. | |
|---|---|---|---|
| 8,586,337 B2 * | 11/2013 | Chandran et al. | 435/170 |

OTHER PUBLICATIONS

International Search Report and The Written Opinion of the International Searching Authority, International Application No. PCT/US2008/078929, Dec. 23, 2008.
Shrestha, N.K., et al., "Conversion of Ammonia to Dinitrogen in Wastewater by Nitrosomonas europaea," Applied Biochemistry and Biotechnology, vol. 90, pp. 221-232, 2001.
Beck, M.B., et al., "Modelling and Operational Control of the Activated Sludge Process in Wastewater Treatment," Nov. 1978.

* cited by examiner

*Primary Examiner* — James Martinell
(74) *Attorney, Agent, or Firm* — Wiggin and Dana LLP; Anthony P. Gangemi

(57) ABSTRACT

Methods of controlling a nitrification reaction in a biological nitrogen removal reactor to favor partial nitrification of ammonia to nitrite instead of complete oxidation of ammonia to nitrate are disclosed. In some embodiments, the methods include the following: maintaining a pH in the reactor within a range that promotes growth of ammonia oxidizing bacteria; maintaining a concentration of dissolved oxygen in the reactor within a range that limits the ammonia oxidizing bacteria from completing nitrification; selecting an operational solids retention time within a range suitable for maintaining increasing concentrations of the ammonia oxidizing bacteria in the reactor while reducing concentrations of nitrite oxidizing bacteria in the reactor; and increasing a concentration of free ammonia in the reactor thereby inhibiting growth of the nitrite oxidizing bacteria in the reactor.

20 Claims, 4 Drawing Sheets

SYSTEMS AND METHODS FOR ACHIEVING PARTIAL NITRIFICATION IN A BIOLOGICAL NITROGEN REMOVAL REACTOR

CROSS REFERENCE TO RELATED APPLICATION(S)

This application is a continuation of U.S. application Ser. No. 12/681,123, filed Apr. 1, 2010, which is incorporated by reference as if disclosed herein in its entirety.

BACKGROUND

Nitrogen containing compounds, primarily ammonia, are a serious water pollutant, which governments have begun regulating more strictly. Combined with increasing population pressures, the need for an efficient method for removing nitrogen from sewage is growing. Nature's own nitrogen cycle employs specialized bacteria to convert ammonia to nitrites and nitrates. Different bacteria then convert these products into inert, atmospheric nitrogen gas. Waste treatment plants employ these same bacteria to perform "biological nitrogen removal" (BNR).

Conventional BNR is achieved by complete oxidation of ammonia to nitrate (nitrification) followed by the reduction of nitrate to dinitrogen gas (denitrification). The typical removal of ammonia involves its oxidation by nitrifying bacteria into nitrite ($NO_2^-$), which is then further oxidized into nitrate ($NO_3^{2-}$). The result is a mixture of nitrite and nitrate. Denitrifying bacteria then covert both nitrite and nitrate into nitrogen gas ($N_2$). The overall result is the conversion of ammonia, a harmful water pollutant, into harmless nitrogen gas, the major component of Earth's atmosphere. Each step of nitrification/oxidation and denitrification/reduction requires resources, in the form of energy, aerated oxygen, and an electron source such as methanol.

The annual costs of treating U.S. wastewater alone are estimated to be $25 billion and escalating. It is also estimated that many more billions will be needed in future decades to maintain and replace ageing infrastructure. Furthermore, expanding wastewater infrastructure to accommodate an increasing population adds to this cost. Globally, there is an urgent need for lower-cost water treatment technologies in developing countries and rural areas.

If engineering based control of nitrification could be achieved to result in partial oxidation of ammonia solely to nitrite, it is estimated that a 25% savings in aeration cost could be realized. Correspondingly, denitrification based on nitrite rather than nitrate could result in up to a 40% savings on electron donor costs.

SUMMARY

Methods of controlling a nitrification reaction in a biological nitrogen removal reactor to favor partial nitrification of ammonia to nitrite instead of complete oxidation of ammonia to nitrate are disclosed. In some embodiments, the methods include the following: maintaining a pH in the reactor within a range that promotes growth of ammonia oxidizing bacteria; maintaining a concentration of dissolved oxygen in the reactor within a range that limits the ammonia oxidizing bacteria from completing nitrification; selecting an operational solids retention time within a range suitable for maintaining increasing concentrations of the ammonia oxidizing bacteria in the reactor while reducing concentrations of nitrite oxidizing bacteria in the reactor; and increasing a concentration of free ammonia in the reactor thereby inhibiting growth of the nitrite oxidizing bacteria in the reactor.

Systems for achieving partial nitrification in a biological nitrogen removal reactor are disclosed. In some embodiments, the systems include the following: a measurement module including testing apparatus for measuring pH, dissolved oxygen, and operational solids retention time in the reactor; a pH control module for comparing pH measured in the reactor to a predetermined range for promoting growth of ammonia oxidizing bacteria and adjusting pH in the reactor if it is not within the predetermined range so that it is within the predetermined range; a dissolved oxygen control module for comparing dissolved oxygen measured in the reactor to a predetermined range for limiting the ammonia oxidizing bacteria from completing nitrification and adjusting dissolved oxygen in the reactor if it is not within the predetermined range so that it is within the predetermined range; and an operational solids retention time control module for comparing the operational solids retention time of the reactor to a predetermined range suitable for maintaining increasing concentrations of the ammonia oxidizing bacteria in the reactor while reducing concentrations of nitrite oxidizing bacteria in the reactor and adjusting operational solids retention time in the reactor if it is not within the predetermined range so that it is within the predetermined range.

Methods of controlling a nitrification reaction in a biological nitrogen removal reactor to favor partial nitrification of ammonia to nitrite instead of complete oxidation of ammonia to nitrate are disclosed. In some embodiments, the methods include the following: maintaining a pH in the reactor about 7.4 to 7.6 so as to promote growth of ammonia oxidizing bacteria; maintaining a concentration of dissolved oxygen in the reactor within a range that limits the ammonia oxidizing bacteria from completing nitrification; selecting an operational solids retention time within a range suitable for maintaining increasing concentrations of the ammonia oxidizing bacteria in the reactor while reducing concentrations of nitrite oxidizing bacteria in the reactor; and increasing a concentration of free ammonia in the reactor thereby inhibiting growth of the nitrite oxidizing bacteria in the reactor.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
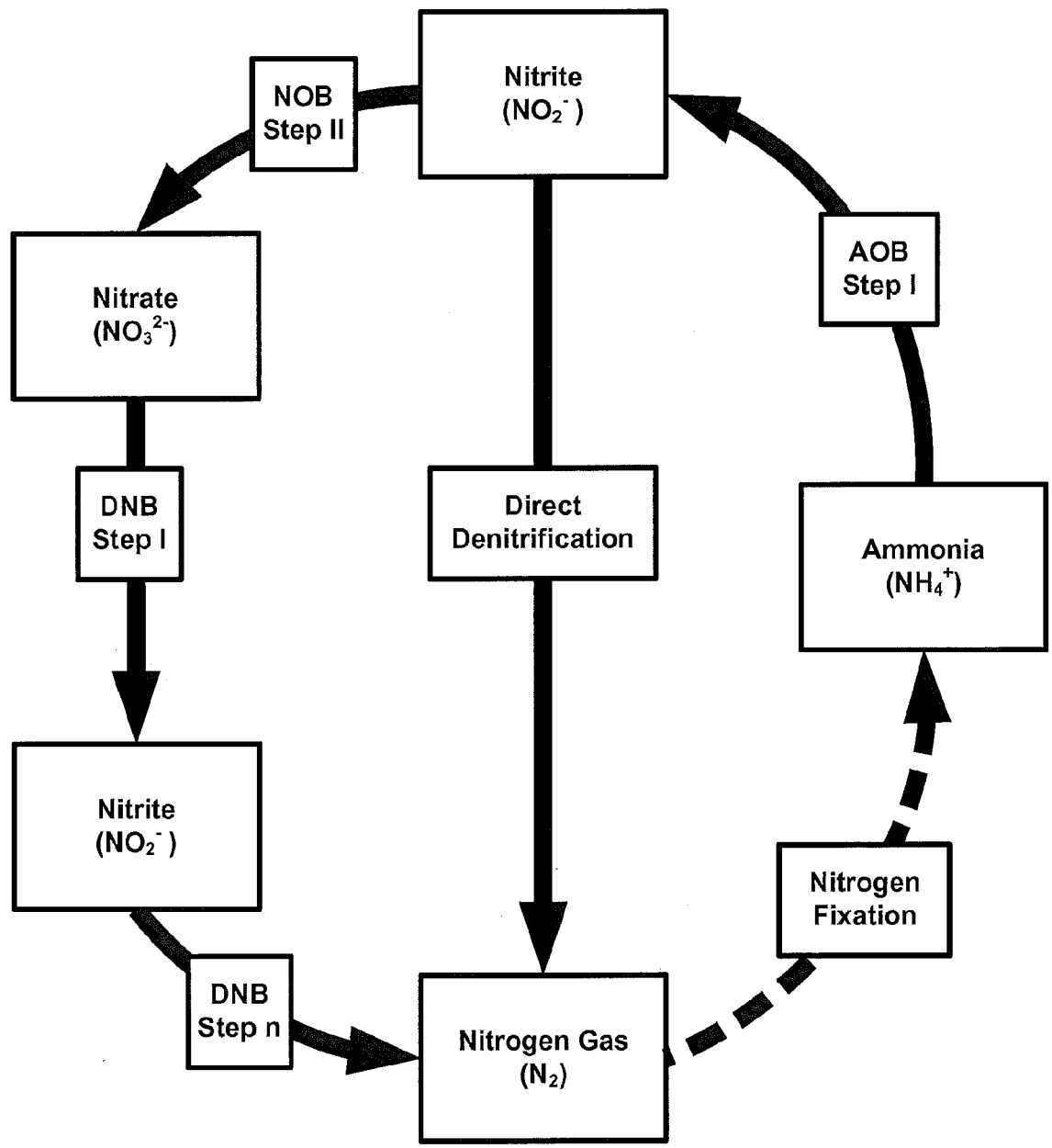
FIG. 1 is a schematic diagram of systems and methods according to some embodiments of the disclosed subject matter.

Referring now to FIG. 1 and as mentioned above, conventional BNR includes nitrification followed by denitrification.

Nitrification includes first using AOB to oxidize ammonia to nitrite ($NO_2^-$) (AOB Step I) and then using NOB to further oxidize the nitrite to nitrate ($NO_3^{2-}$) (NOB Step II). Denitrification includes the reduction of nitrate, and any remaining nitrite, to nitrogen gas ($N_2$) (DNB Steps I . . . n). As shown in FIG. 1 and indicated by the center vertical arrow extending from the nitrite box at twelve o'clock to the nitrogen gas box at six o'clock, partial nitrification avoids the production of nitrates and causes direct denitrification from nitrite to nitrogen gas thereby increasing the efficiency of the process.

Partial nitrification results from selective proliferation of ammonia oxidizing bacteria (AOB) over nitrite oxidizing bacteria (NOB). Systems and methods according to the disclosed subject matter include BNR reactor operating parameters that facilitate the proliferation of AOB over NOB and thus facilitate partial nitrification. To limit the oxidation of nitrite to nitrate and thus help AOB concentrations in a BNR reactor to build, low dissolved oxygen (DO) concentrations are maintained during nitrification, which serves to prevent AOB bacteria from completing nitrification because AOB typically have a higher affinity for oxygen than NOB. In addition, the BNR reactor is operated with an operational solids retention time (SRT) that facilitates selective NOB washout. As the AOB begins to dominate over the NOB, higher free ammonia (FA) concentrations are found, which helps to further inhibit NOB growth.

Figure 2:
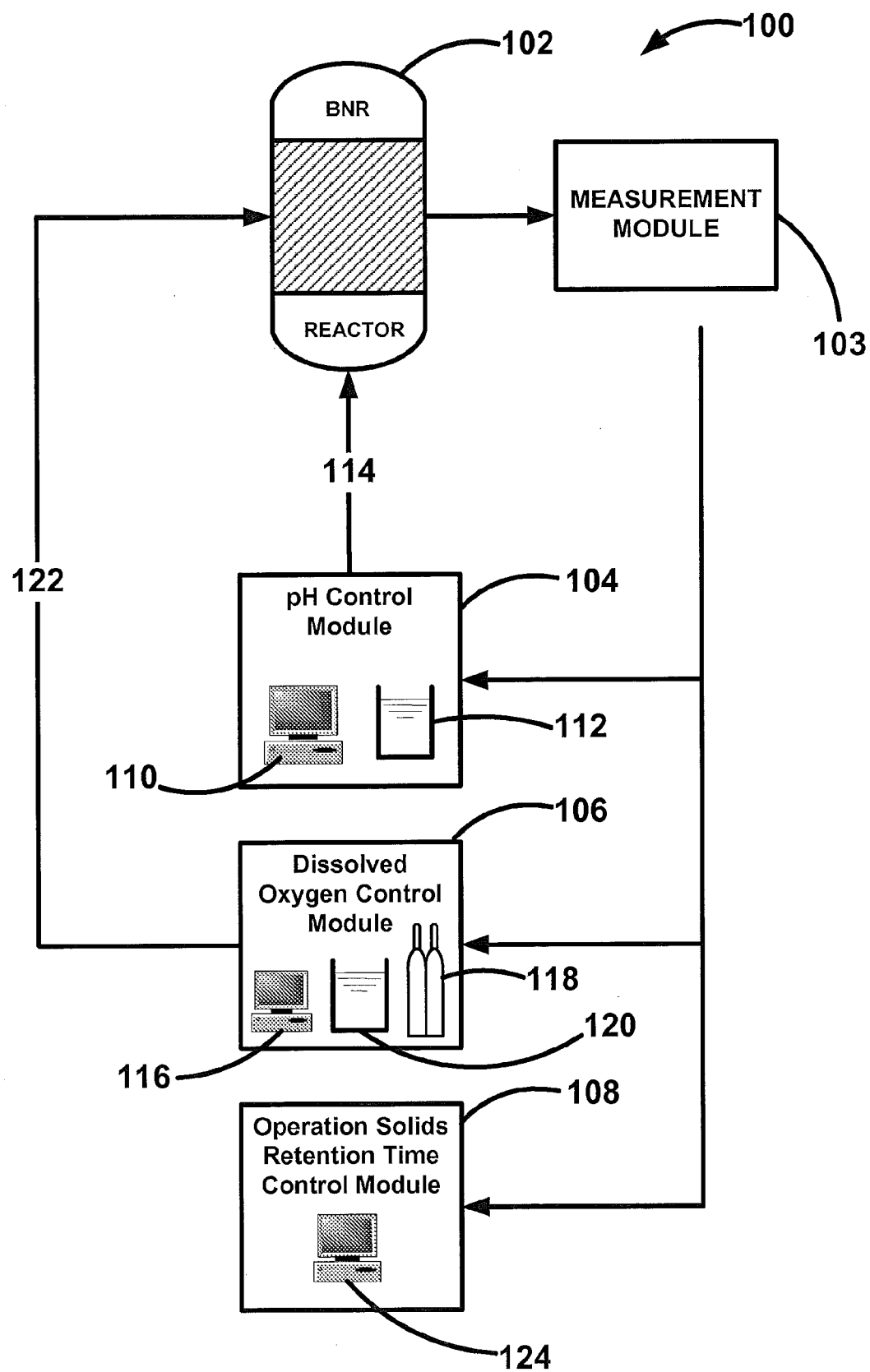
FIG. 2 is a schematic diagram of systems according to some embodiments of the disclosed subject matter.

Generally, the disclosed subject matter relates to systems and methods for controlling nitrification reactions so that partial nitrification is achieved. Referring now to FIG. 2, some embodiments of the disclosed subject matter include a system 100 for achieving partial nitrification in a biological nitrogen removal reactor 102. System 100 includes a measurement module 103, a pH control module 104, a DO control module 106, and an operational SRT control module 108.

Measurement module 103 includes testing apparatus for measuring pH, dissolved oxygen, and operational SRT in reactor 102. Measurements from measurement module 103 are relayed to pH control module 104, DO control module 106, and operational SRT control module 108.

pH control module 104 includes apparatus such as a software program (not shown) residing on a computing device 110 for comparing pH measured in reactor 102 to a predetermined range for promoting growth of AOB. In some embodiments, a substantial portion of the AOB in reactor 102 is related to Nitrosomonas europaea. pH control module 104 also includes apparatus such as a chemical storage tank 112 and a conduit 114 for providing chemicals to reactor 102 to adjust pH in the reactor if it is not within a predetermined range in an effort to bring it to within the predetermined range. In some embodiments, the predetermined range for pH is from about 7.4 to 7.6. In some embodiments, chemicals for adjusting pH include sodium bicarbonate. Of course, other chemicals that will not interfere with the growth of AOB can also be used for adjusting pH in reactor 102.

DO control module 106 includes apparatus such as a software program (not shown) residing on a computing device 116 for comparing DO measured in reactor 102 to a predetermined range for limiting the AOB from completing nitrification. DO control module 106 also includes apparatus such as an air supply 118, chemical supply 120, and conduits 122 for adjusting DO in reactor 102 if it is not within the predetermined range so that it is within the predetermined range. In some embodiments, the predetermined range for DO is about 0.6 to 2.5 mg O2/L. In some embodiments, chemical supply 120 includes ammonium and DO is adjusted by injecting a mixture of air and ammonium into reactor 102 via conduits 122.

Operational SRT control module 108 includes apparatus such as a software program (not shown) residing on a computing device 124 for comparing the operational SRT of reactor 102 to a predetermined range suitable for maintaining increasing concentrations of AOB in the reactor while reducing concentrations of NOB in the reactor. Operational SRT control module 108 includes can include alarms or alerts for adjusting operational SRT in the reactor if it is not within the predetermined range so that it is within the predetermined range. In some embodiments, the predetermined range of the operational SRT is about 2.5 to 3.5 days.

System 100 is typically operated so that reactor 102 is at a temperature substantially close to ambient. System 100 is configured to operate either manually or automatically and in real time.

Figure 3:
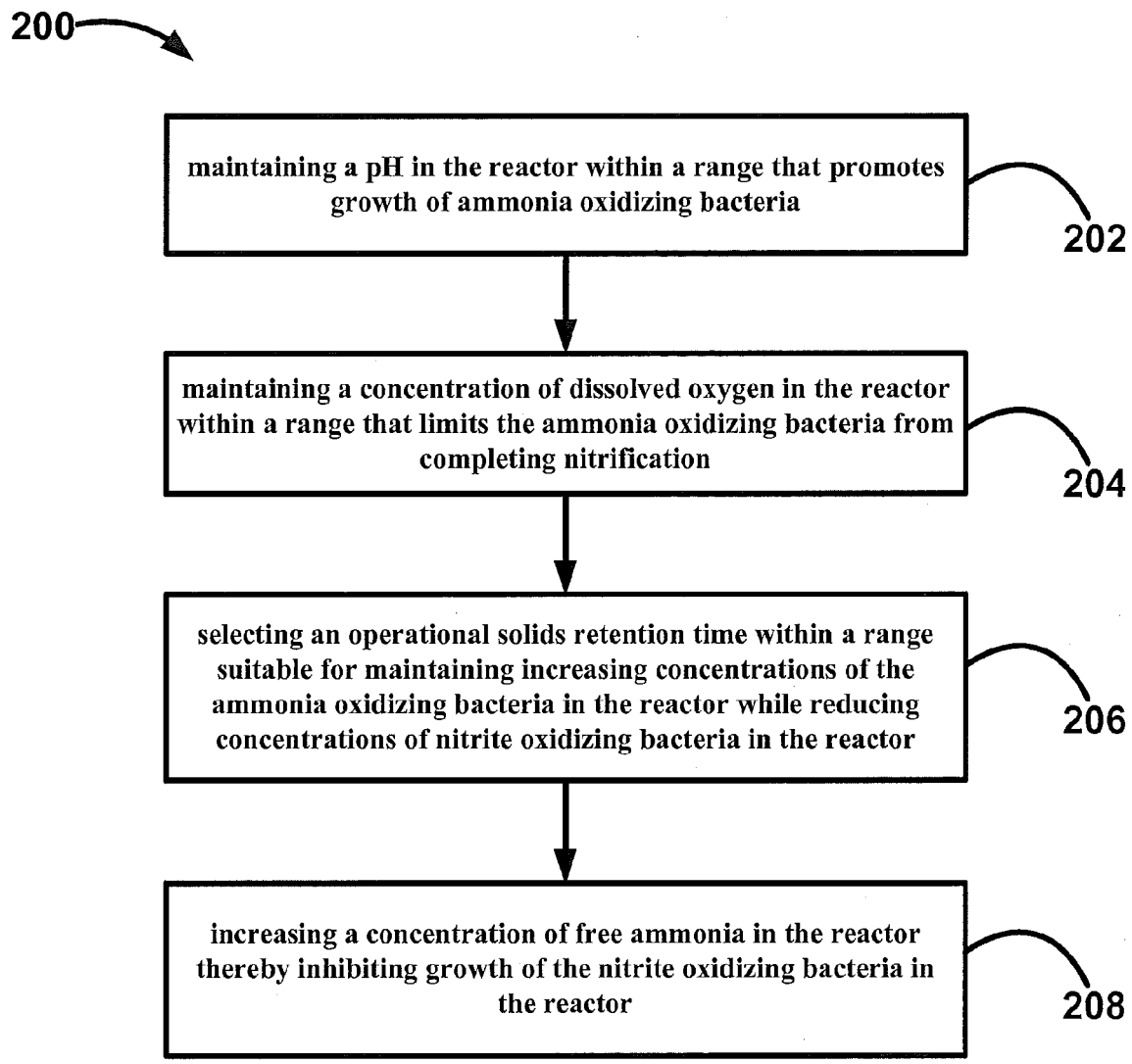
FIG. 3 is a diagram of a method according to some embodiments of the disclosed subject matter.

Referring now to FIG. 3, some embodiments include a method 200 of controlling a nitrification reaction in a biological nitrogen removal reactor to favor partial nitrification of ammonia to nitrite instead of complete oxidation of ammonia to nitrate. At 202, method 200 includes maintaining a pH in the reactor within a range that promotes growth of AOB. In some embodiments, the range of pH in the reactor is about 7.4 to 7.6. At 204, a concentration of dissolved oxygen in the reactor is maintained within a range that limits AOB from completing nitrification. In some embodiments, the range of dissolved oxygen in the reactor is about 0.6 to 2.5 mg O2/L. At 206, an operational SRT is selected so as to be within a range suitable for maintaining increasing concentrations of the AOB in the reactor while reducing concentrations of NOB in the reactor. In some embodiments, the operational SRT is about 2.5 to 3.5 days. In some embodiments, the operational SRT is 3.0 days. At 208, a concentration of free ammonia in the reactor increases over the operational SRT thereby inhibiting growth of the NOB in the reactor. In some embodiments, method 200 includes operating the reactor at a temperature substantially close to ambient. In some embodiments, method 200 is practiced where a substantial portion of the AOB in the reactor is related to Nitrosomonas europaea.

Performance of systems and methods according to the disclosed subject matter was evaluated by creating, operating, and observing the operation of a laboratory-scale BNR reactor, which was operated according to the disclosed subject matter. Observation of the laboratory-scale BNR reactor included DNA extraction, cloning, sequencing, and quantification of AOB and NOB concentrations via real time qPCR. The cell concentrations were converted to AOB and NOB biomass COD concentrations ($X_{AOB}$ and $X_{NOB}$).

Figure 4:
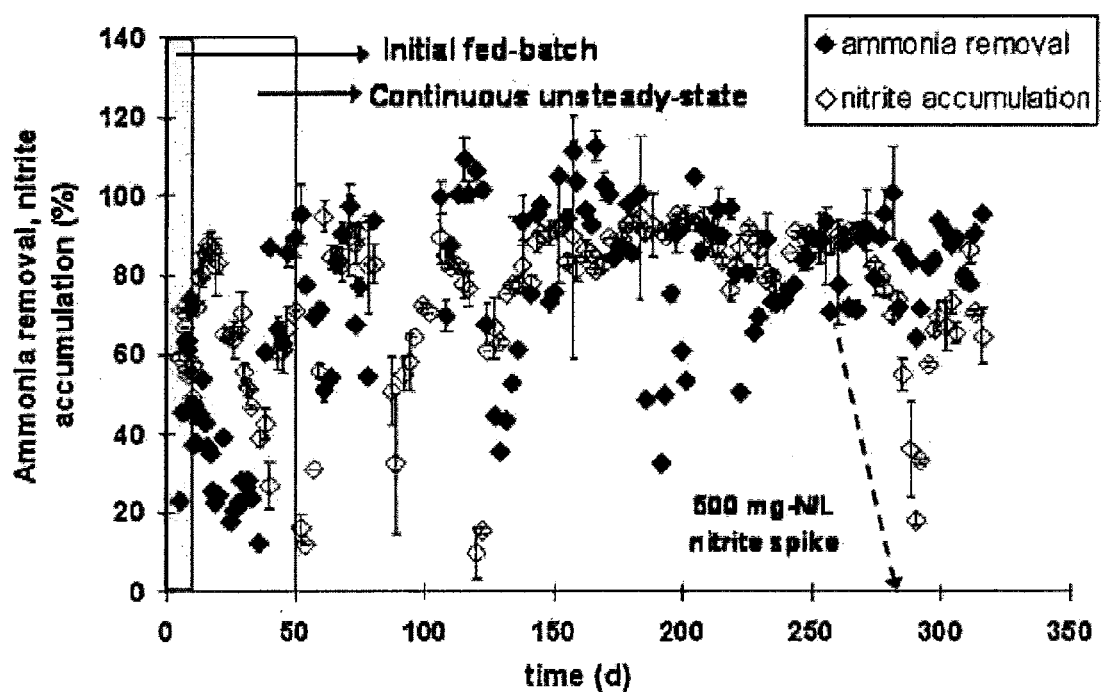
FIG. 4 is a chart of ammonia removal and nitrite accumulation during operation of systems and methods according to the disclosed subject matter.

Referring now to FIG. 4, partial nitrification performance is high as reflected by long term stability of ammonia to nitrite oxidation. Initiation of steady-state was operationally defined as the first day of operation when an operational SRT of 3 days running average averaged ammonia removal and nitrite accumulation that were both higher than 66%. Based on this criterion, steady-state based on bioreactor performance was achieved within 47 days of continuous operation. After reaching steady-state, long term stability of ammonia to nitrite oxidation was reflected in 82.1±17.2% ammonia removal relative to influent ammonia concentrations. The major fraction of ammonia oxidized was to nitrite 77.3±19.5% and not to nitrate 19.7±18.3%. Based on a nitrogen mass balance around the reactor, minimal nitrogen losses of 7±8.3% were observed. Bioreactor performance was transiently diminished by a nitrite shock load introduced to the reactor after 283 days.

Figure 5:
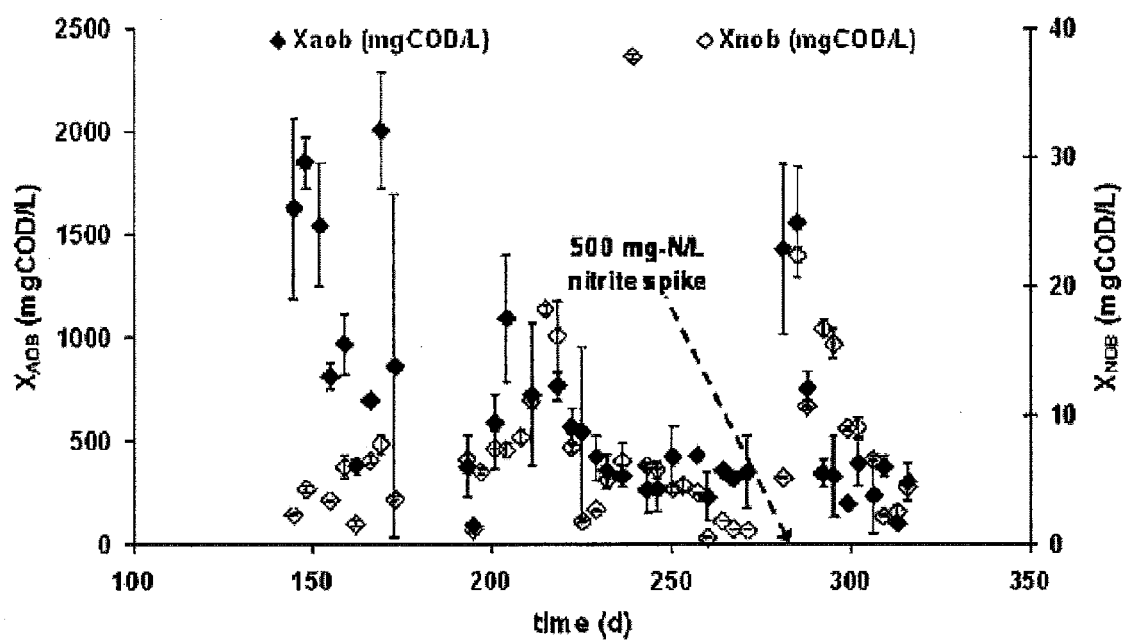
FIG. 5 is a chart of AOB and NOB biomass COD concentrations ($X_{AOB}$ and $X_{NOB}$) measured in real time using qPCR testing for systems and methods according to the disclosed subject matter.

Microbial population diversity and abundance in the bench-scale reactor were also evaluated. Based on clone libraries constructed from DNA extracts obtained on two independent sampling dates (before and after the nitrite spike), most bioreactor AOB were closely related to *N. europaea*. Clones related to AOB such as *Nitrosospira* spp. or NOB, *Nitrobacter* spp. or *Nitrospira* spp. were not detected. Referring now to FIG. 5, the dominance of AOB determined via clone library analysis was corroborated by routine qPCR results. As observed with sOUR measures, microbial abundance also varied quite dynamically, although bioreactor performance was at steady-state for most of the study period. During steady-state operation, AOB constituted 61±45% of the total bioreactor population as COD. The corresponding steady-state *Nitrobacter* spp. related NOB fraction was much lower at 0.7±1.1%. As shown in FIG. 5, the increased SRT, combined with the increased reactor nitrite concentrations, following the nitrite spike resulted in a rapid and transient increase in $X_{NOB}$ concentrations. This trend suggested that select NOB populations remained viable and poised to proliferate in the partial nitrification bioreactor, when the optimal conditions arose.

The population of AOB in the bench-scale BNR reactor operated according to systems and methods of the disclosed subject matter far exceeds that of NOB, resulting in the nitrification process essentially stopping at nitrite without proceeding to nitrate. Thus, partial nitrification was achieved.

Methods according to the disclosed subject matter provide advantages and benefits over known methods. BNR strategies based on partial nitrification are more sustainable than those based on conventional nitrification owing to their lower operating costs, e.g., 25% less oxygen and 40% less electron donor for denitrification. Sustained partial nitrification was achieved by selective washout of NOB via a combination of free ammonia toxicity, low DO concentration, and operation at an NOB limiting SRT. The imposed bioreactor operating conditions enriched for distinct AOB (ecologically) and NOB (ecologically and biokinetically) populations compared to those in conventional activated sludge bioreactors.

Methods and systems according to the disclosed subject matter improve the efficiency of nitrogen removal during waste treatment over known systems and methods. By performing partial nitrification, the costs in conventional treatment systems attributed to converting to and from nitrate are avoided. This will result in significant savings for any public or private entity tasked with removing nitrogen from waste.

Another large source of nitrogen pollution is from animal agriculture. Systems and methods according to the disclosed subject matter could be applied on a smaller scale to treat animal waste and reduce its toxicity before it is dumped into lakes and rivers. Since the input waste is essentially the same as a city's sewage, systems and methods according to the disclosed subject matter will apply equally well.

Systems and methods according to the disclosed subject matter can be used to treat various runoff waters containing ammonia. For example, landfill leachate is typically high in ammonia produced by the decomposition of biological matter and requires treatment. Fertilizer runoff from farms is also typically high in ammonia and requires treatment. Systems and methods according to the disclosed subject matter could also be used to remove nitrogen in lower concentrations from polluted lakes and rives in areas with intensive agriculture.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A method of controlling a nitrification reaction in a biological nitrogen removal reactor to favor partial nitrification of ammonia to nitrite instead of complete oxidation of ammonia to nitrate, said method comprising:
   promoting growth of ammonia oxidizing bacteria;
   limiting said ammonia oxidizing bacteria from completing nitrification;
   selecting an operational solids retention time within a range suitable for maintaining
   increasing concentrations of said ammonia oxidizing bacteria in said reactor while reducing concentrations of nitrite oxidizing bacteria in said reactor; and
   increasing a concentration of free ammonia in said reactor thereby inhibiting growth of said nitrite oxidizing bacteria in said reactor.

2. The method according to claim 1, wherein said step of promoting includes maintaining a pH in said reactor within a range that promotes the growth of ammonia oxidizing bacteria.

3. The method according to claim 2, wherein said pH is about 7.4 to 7.6.

4. The method according to claim 1, wherein said step of limiting said ammonia oxidizing bacteria from completing nitrification includes maintaining a concentration of dissolved oxygen in said reactor within a range that limits said ammonia oxidizing bacteria from completing nitrification.

5. The method according to claim 3, wherein said dissolved oxygen in said reactor is about 0.6 to 2.5 mg O2/L.

6. The method according to claim 1, wherein said solids retention time is about 2.5 to 3.5 days.

7. The method according to claim 1, wherein said reactor is operated at a temperature that is substantially the ambient temperature.

8. The method according to claim 1, wherein a portion of said ammonia oxidizing bacteria in said reactor is *Nitrosomonas europaea*.

9. A system for achieving partial nitrification in a biological nitrogen removal reactor, said system comprising:
   testing apparatus for measuring pH, dissolved oxygen, and solids retention time in said reactor;
   a pH control module for maintaining pH in said reactor within a range that promotes growth of ammonia oxidizing bacteria;
   a dissolved oxygen control module for maintaining dissolved oxygen in said reactor within a range that prevents ammonia oxidizing bacteria from completing nitrification; and
   a solids retention time control module for maintaining operational solids retention time in said reactor within a range suitable for maintaining increasing concentrations of said ammonia oxidizing bacteria in said reactor while reducing concentrations of nitrite oxidizing bacteria in said reactor;
   wherein said system increases a concentration of free ammonia in said reactor thereby inhibiting growth of said nitrite oxidizing bacteria in said reactor.

10. The system according to claim 9, wherein said pH control module is effective to adjust the pH in said reactor so that it is within a predetermined range.

11. The system according to claim 10, wherein said predetermined range for pH in said reactor is about 7.4 to 7.6.

12. The system according to claim 10, wherein said pH control module includes apparatus for adding sodium bicarbonate to said reactor to adjust pH.

13. The system according to claim 9, wherein said dissolved oxygen control module is effective to adjust the dissolved oxygen in said reactor so that it is within a predetermined range.

14. The system according to claim 13, wherein said predetermined range for dissolved oxygen in said reactor is about 0.6 to 2.5 mg O2/L.

15. The system according to claim 13, wherein said dissolved oxygen module includes apparatus for injecting a mixture of air and ammonium into said reactor to adjust dissolved oxygen.

16. The system according to claim 9, wherein said operational solids retention time control module is effective to adjust the operational solids retention time in said reactor so that it is within a predetermined range.

17. The system according to claim 16, wherein said predetermined range for solids retention time is about 2.5 to 3.5 days.

18. The system according to claim 9, wherein said reactor is operated at a temperature that is substantially the ambient temperature.

19. The system according to claim 9, wherein said system is configured to operate automatically and in real time.

20. The system according to claim 9, wherein a portion of said ammonia oxidizing bacteria in said reactor is *Nitrosomonas europaea*.

* * * * *